(12) United States Patent
Adema et al.

(10) Patent No.: US 6,585,286 B2
(45) Date of Patent: Jul. 1, 2003

(54) VEHICLE SUSPENSION

(75) Inventors: Daniel R. Adema, Kitchener (CA); Ashley T. Dudding, Plainfield, IL (US); Michael J. Gottschalk, Granville, OH (US); Roger D. Jable, Downers Grove, IL (US); Christopher B. Wall, Elmhurst, IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 10/010,766

(22) Filed: Dec. 7, 2001

(65) Prior Publication Data

US 2002/0163165 A1 Nov. 7, 2002

Related U.S. Application Data

(60) Provisional application No. 60/255,028, filed on Dec. 12, 2000.

(51) Int. Cl.⁷ ................................................. B60G 5/02
(52) U.S. Cl. ............................... 280/677; 280/124.178; 280/681
(58) Field of Search ................................ 280/676, 677, 280/681, 687, 124.177, 124.178, 682, 683; 267/294

(56) References Cited

U.S. PATENT DOCUMENTS

| | | | | |
|---|---|---|---|---|
| 3,618,971 A | * | 11/1971 | Wragg | 267/279 |
| 3,936,073 A | * | 2/1976 | Hickman et al. | 267/33 |
| 3,984,125 A | * | 10/1976 | Paton et al. | 105/198.7 |
| 4,082,316 A | * | 4/1978 | Raidel | 267/292 |
| 4,357,032 A | * | 11/1982 | Kenyon | 267/292 |

FOREIGN PATENT DOCUMENTS

| | | | |
|---|---|---|---|
| DE | 42 09 192 | | 9/1992 |
| GB | 2 046 680 A | * | 11/1980 |
| GB | 2 069 424 A | * | 8/1981 |
| GB | 2 208 374 A | * | 3/1989 |
| GB | 2 241 679 A | | 9/1991 |
| GB | 2 254 056 A | | 9/1992 |

\* cited by examiner

Primary Examiner—Paul N. Dickson
Assistant Examiner—Ruth Ilan
(74) Attorney, Agent, or Firm—Cook, Alex, McFarron, Manzo, Cummings & Mehler, Ltd.

(57) ABSTRACT

A vehicle suspension for connecting a vehicle frame rail to a first vehicle axle and for connecting the vehicle frame rail to a second vehicle axle includes a fabricated equalizing beam connected to the first and second vehicle axles, a split bolster spring assembly connected to the equalizing beam, a fabricated saddle connected to the split bolster spring assembly, and a modular shear plate connected to the saddle and to the vehicle frame rail. The modular shear plate permits use of a universal saddle for mounting to a variety of vehicle frame configurations.

17 Claims, 7 Drawing Sheets

VEHICLE SUSPENSION

CROSS-REFERENCE TO RELATED APPLICATION

This application claims a benefit of priority from U.S. Provisional Application No. 60/255,028, filed Dec. 12, 2000, the full disclosure of which is hereby incorporated herein by reference.

BACKGROUND OF THE INVENTION

The present invention is directed to a vehicle suspension and particularly to a vehicle suspension adapted for the vocational vehicle market. The invention reduces the manufacturing cost and overall system weight of vehicle suspensions.

FIG. 1 illustrates a known vehicle suspension designated 20 designed to support vehicle frame rails (not shown) positioned on opposite sides of a vehicle center line in spaced relation above vehicle axles (not shown) of a tandem axle configuration for the vehicle. It will be appreciated that vehicle suspension components positioned on one side of the vehicle to support the vehicle frame rail of that side above its adjacent ends of the axles are duplicated on the other side of the vehicle to support the opposite vehicle frame rail above the opposite ends of the vehicle axles.

Vehicle suspension 20 includes an equalizing beam 22 extending longitudinally between the ends of the axles on a particular side of the vehicle. Equalizing beam 22 is connected to a vehicle frame rail bracket 24 by way of, among other things, bolster springs 26.

In this known vehicle suspension 20, the bolster springs 26 are positioned coincident with the wind up center of equalizing beam 22 to eliminate axle load transfer during braking and acceleration of the vehicle. In this arrangement, the bolster springs 26 are positioned inboard of the centerline of equalizing beam 22. This positioning of the bolster springs 26 creates a moment imbalance, which necessitates the use of a cross tube 28 to resist the moment forces.

Cross tube 28 extends laterally between the equalizing beams 22 positioned on opposite sides of the vehicle. The use of this cross tube increases manufacturing cost and overall system weight of the vehicle suspension. Additionally, use of this vehicle suspension requires an equalizing beam 22 that is unduly large and heavy, thereby translating into additional cost of the vehicle suspension, and in the case of commercial vehicles, reducing payload capacity.

FIG. 2 illustrates another prior vehicle suspension generally designated 30 designed to eliminate the shortcomings of the vehicle suspension 20 shown in FIG. 1, particularly those shortcomings that result from the moment imbalance due to the position of the bolster springs thereof. For the vehicle suspension 30, its bolster springs 32 are positioned above the equalizing beam 34 in a manner such that they are symmetrically positioned with respect to the vertical plane extending longitudinally through the center line of the equalizing beam. In other words, the bolster springs 32 are symmetrically inboard and outboard of the beam, thereby eliminating the requirement of a cross tube.

By positioning the bolster springs 32 vertically above the equalizing beam 34, however, the suspension 30 couples the vertical and articulation motions with the fore-and-aft motion. This coupling creates axle load transfer under braking and acceleration. It also reduces vehicle ride comfort.

One unique feature of the suspension disclosed herein is the repositioning of rubber bolster springs for performance and enhancement. The bolster spring pairs are positioned about a suspension walking beam on opposite sides thereof. This permits the uncoupling of the articulation and vertical motions of a walking beam suspension from the induced fore/aft motion by repositioning the rubber bolster springs coincident with the windup center of the walking beam. It also eliminates the necessity of a cross tube, further reducing cost and weight from the suspension system.

The use of split bolster springs provides the benefit of the bolsters being coincident with the windup center of the beam without the penalty of either a cross tube to absorb the moment imbalance of inboard bolsters, or the penalty of an excessively large beam to span outside of the bolsters. The split bolster spring arrangement uncouples the vertical and articulation motions from induced fore/aft motions, resulting in improved vehicle braking and ride characteristics.

The split bolster arrangement allows the bolsters to be lowered to straddle the beam, thereby situating their line of action coincident with the beam centerline. This eliminates the fore/aft motion induced by vertical or articulation motion. Also, because the bolster pairs are symmetrically inboard and outboard of the beam, there is no moment imbalance and therefore no requirement for a cross tube.

The fundamental principle behind the inherent benefits of the split bolster configuration is the static equilibrium equation, (i.e., $\Sigma M=0$). By lowering the bolster line of action to the beam centerline, the moment arm has been reduced to zero, thus eliminating fore/aft motion. By positioning the bolster pair symmetrically straddling the beam, the resultant moment is zero.

The addition of molded-in studs for assembly reduces the width of the part, allowing the outboard bolster springs to be positioned alongside the beam without interference to the tire. This increases the quantity of rubber bolsters required per suspension resulting in improved economies of scale, thereby reducing unit cost. As a result, there is enhanced suspension articulation (increased range of motion) and ride quality.

Referring back to FIG. 2, the fabricated equalizing beam 34 of the vehicle suspension 30 illustrated therein includes two symmetric channeled sections 36, 38 that must be projection-welded together at a center weld 40. The projection-welding process requires a special set up and often suffers from a blow-through condition in production. The center weld is discontinuous and positioned on the bottom side of fabricated equalizing beam 34, which can result in stresses that may contribute to tensile load conditions. The center weld also makes it difficult, if not impossible, to attach brackets on beam 34 at a center location thereof. As shown, the bolster springs 32 are connected to the equalizing beam 34 by downwardly extending brackets positioned on longitudinally opposite sides of center weld 40.

Another unique feature of the disclosed suspension is that a fabricated walking beam is designed in a simplified manner to eliminate weld complexity. In the fabricated beam, fewer components and improved weld conditions are present. The main channel is formed by a U-shaped one piece structure, rather than the two piece design used in conventional fabricated beams. This results in a continuous weld condition on the top surface of beam, eliminating the need for the discontinuous center weld, which is often difficult to produce. Additionally, a simple fabricated bracket has been attached to the walls of the main channel on both the inboard and outboard walls to permit mounting of the split pair bolster spring assembly. Because this simple bracket design is common to both sides of the beam, it eliminates part complexity.

The fabricated beam reduces actual welding time, in addition to the number of setups, and time required for each setup. In addition, the positioning of the weld at the top of the beam permits the weld to work in compression rather than tension, providing greater durability.

The fabricated beam eliminates the need for a center weld, thereby improving the inherent strength of the beam and improving manufacturability. Positioning of the welds at the top of the beam places the welding in a compression load condition, making it an inherently durable structure.

With regard to the fabricated beam, there is a reduced number of components. It is also reduced weight (improved design optimization). Also, the designed "racetrack" feature on the A-shaped side brackets improves welding over prior art beams.

With prior vehicle suspensions, a different saddle must be maintained for use on each particular vehicle frame configuration. This requires a unique saddle to be designed, developed, maintained and stored for each unique vehicle frame configuration. It will be appreciated by those skilled in the art that this enduring problem has increased the costs associated with the manufacture and service of vehicle suspensions.

Another unique feature of the vehicle suspension disclosed herein is that a modular shear (attachment) plate connects the saddle to the vehicle frame rail. As a result, multiple vehicle frame configurations (i.e., ride heights and frame widths) can be absorbed through modifications to the hole/bore positions machined through the shear plate, permitting production of a uniform, universal saddle. This results in reduced inventory of saddle subassemblies.

The modular shear plate design permits compatibility to any industry standard frame configuration with the replacement of an interchangeable attachment part. This shear (or attachment) plate also simplifies the components that must be maintained in inventory. The modular attachment (shear) plate simplifies assembly and reduces component inventory.

The modular shear/attachment plate allows for a universal saddle subassembly that can be sized and adapted for all truck frame configurations. As a result, a single main saddle subassembly can be used for all truck frame configurations. Various attachment plates will be used for each particularly different truck frame configuration. With respect to the shear plate, it reduces the fabricated component complexity, reduces the length of the weld translating into lower production costs, and allows for fewer weld setup fixtures and station requirements, translating into lower tooling investment costs.

The above-noted and other desired benefits of the preferred form of the invention will be apparent from the following description. It will be understood, however, that a system or embody could still appropriate the claimed invention without accomplishing each and every one of the desired benefits, including those gleaned from the following description. The appended claims, not these desired benefits, define the subject matter of the invention. Any and all benefits are derived from the preferred form of the invention, not necessarily the invention in general.

BRIEF SUMMARY OF THE INVENTION

In a preferred embodiment, the present invention is directed to a vehicle suspension for supporting a longitudinally extending vehicle frame rail above the adjacent ends of tandem axles. The suspension includes a longitudinally extending equalizing beam connected to each such end of the tandem axles. First and second bolster springs are mounted to and straddle the equalizing beam. The first bolster spring is positioned outboard of the equalizing beam. The second bolster spring is positioned inboard of the equalizing beam. Third and fourth bolster springs are mounted to and straddle the equalizing beam. The third and fourth bolster springs are positioned forward of the first and second bolster springs. The third bolster spring is positioned outboard of the equalizing beam. The fourth bolster spring is positioned inboard of the equalizing beam. Most preferably, the bolster springs are positioned coincident with the wind up center of the equalizing beam.

In the preferred embodiment, A saddle is mounted to the bolster springs. An attachment plate is mounted to the saddle and to the vehicle frame rail.

With respect to the equalizing beam, it preferably includes a longitudinally extending U-shaped main channel and a longitudinally extending top plate. The main channel and top plate are welded together along the top of the equalizing beam.

With respect to the attachment plate, it preferably includes a mounting surface that is designed to have bores machined through it. The mounting surface is configured such that the bores can be machined through it at a variety of positions and the saddle can be used with a variety of vehicle frame rail configurations.

BRIEF DESCRIPTION OF THE SEVERAL VIEWS OF THE DRAWING

In this written description, reference has been and will be made to the following figures of the drawing, wherein like parts have like reference numerals, and wherein.

DETAILED DESCRIPTION OF THE INVENTION

Figure 1:
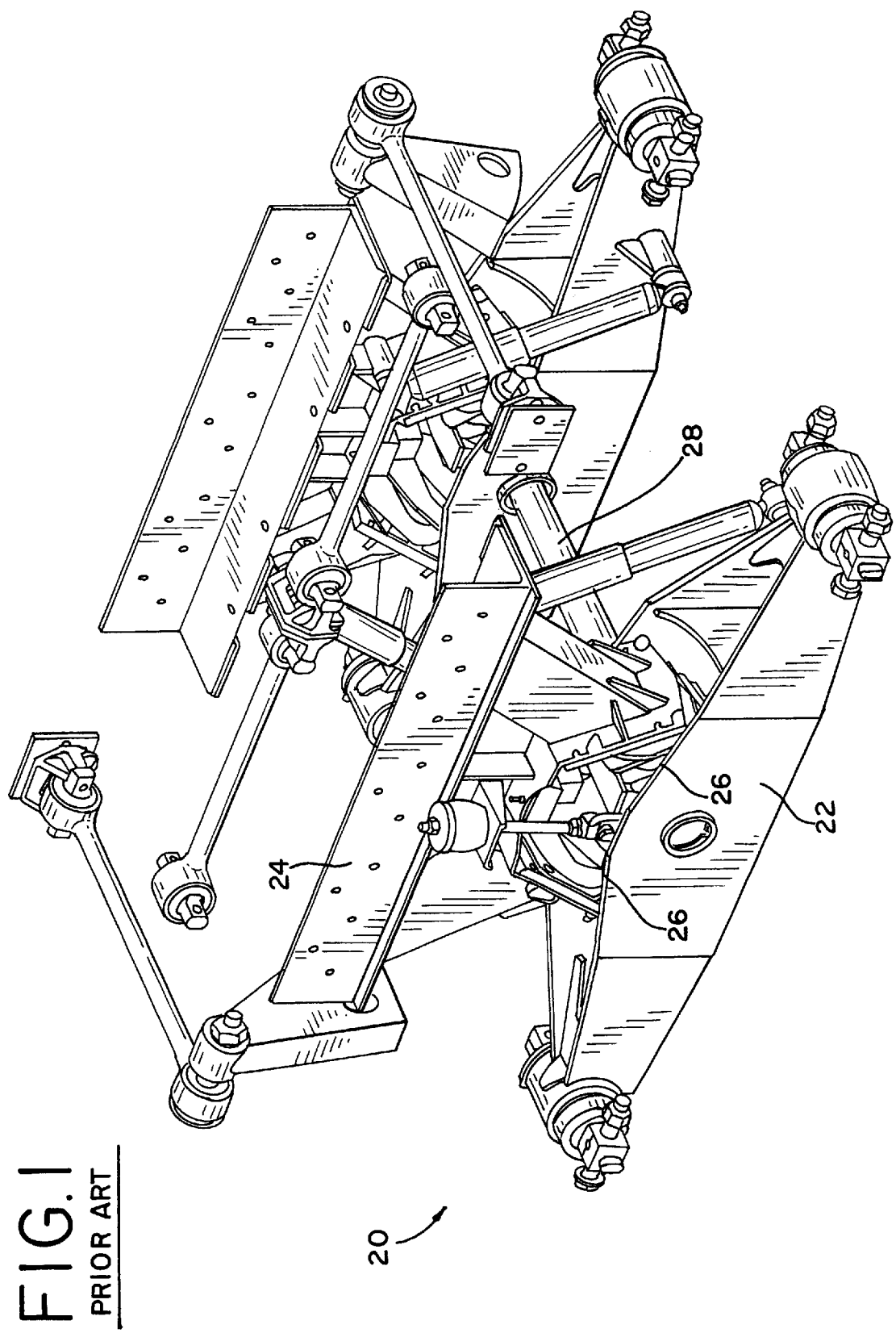
FIG. 1 is a perspective view of a prior art vehicle suspension.
Figure 2:
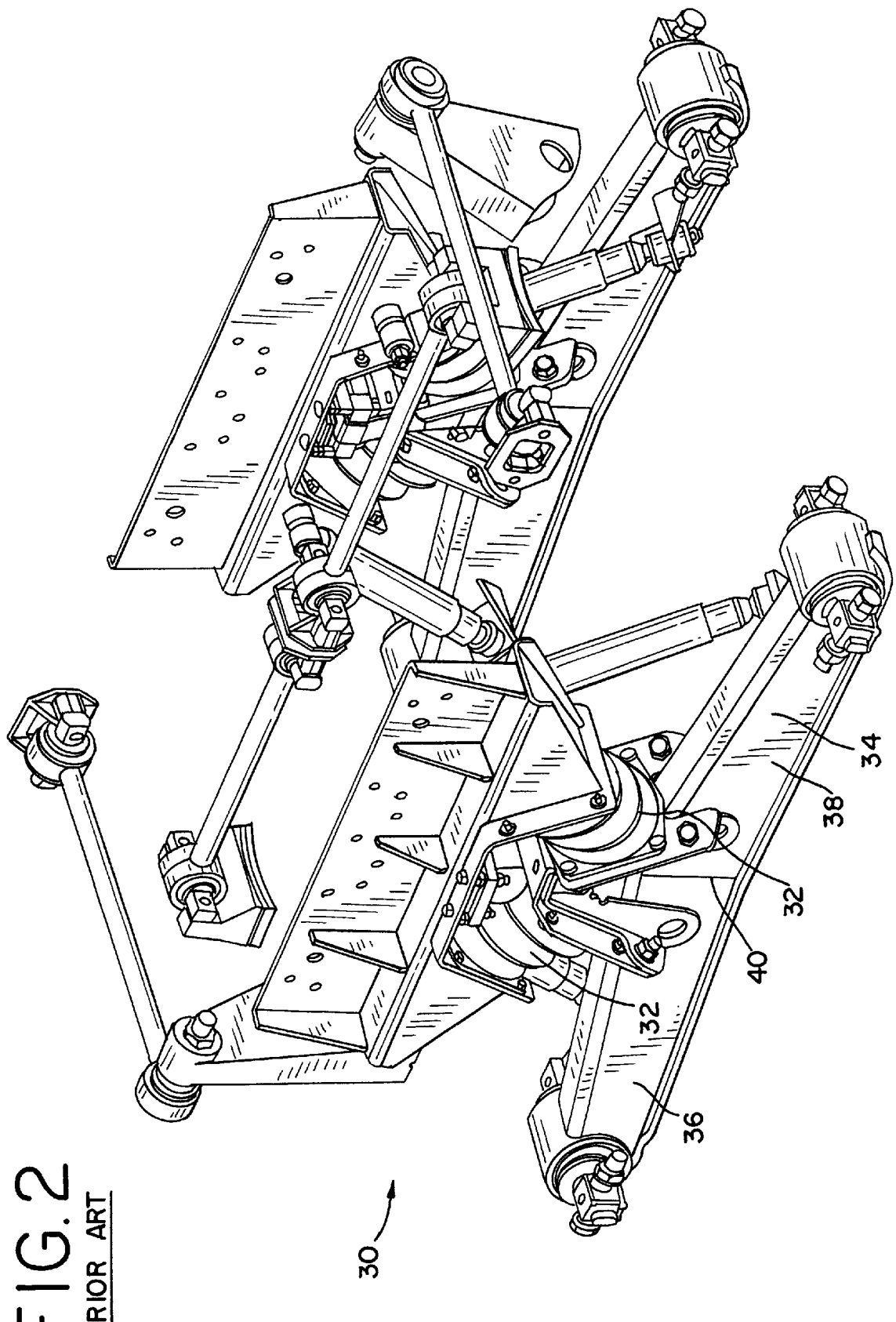
FIG. 2 is a perspective view of another prior art vehicle suspension.
Figure 3:
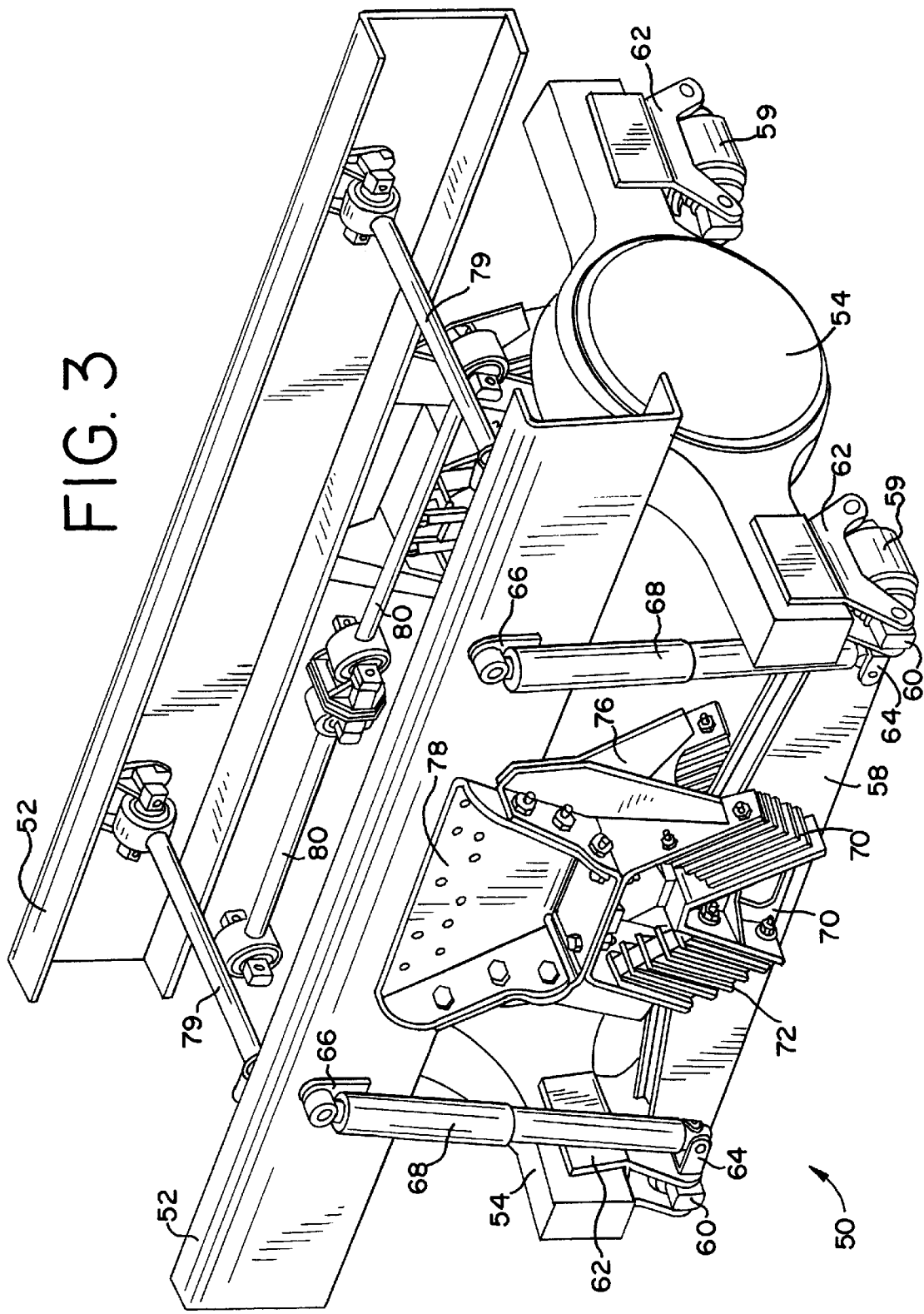
FIG. 3 is a perspective view of vehicle frame rails, vehicle axles and a vehicle suspension constructed in accordance with the principles of the present invention.
Figure 4:
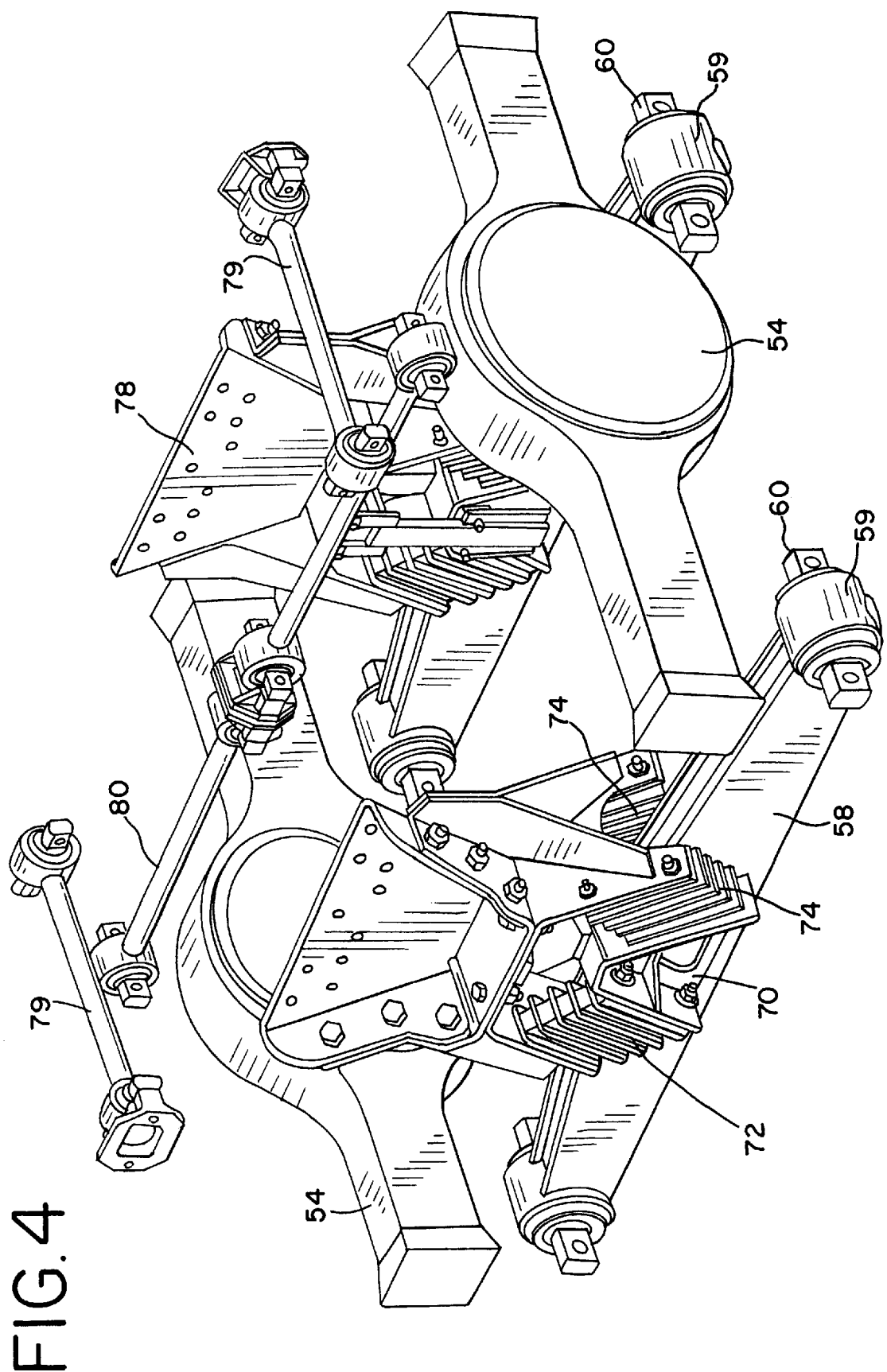
FIG. 4 is a perspective view similar to FIG. 3, but without the vehicle frame rails.
Figure 7:
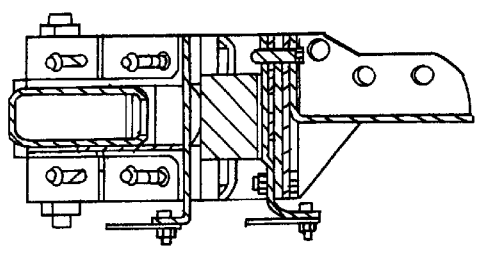
FIG. 7 is a sectional view, taken along line 7—7 of FIG. 5.
Figure 6:
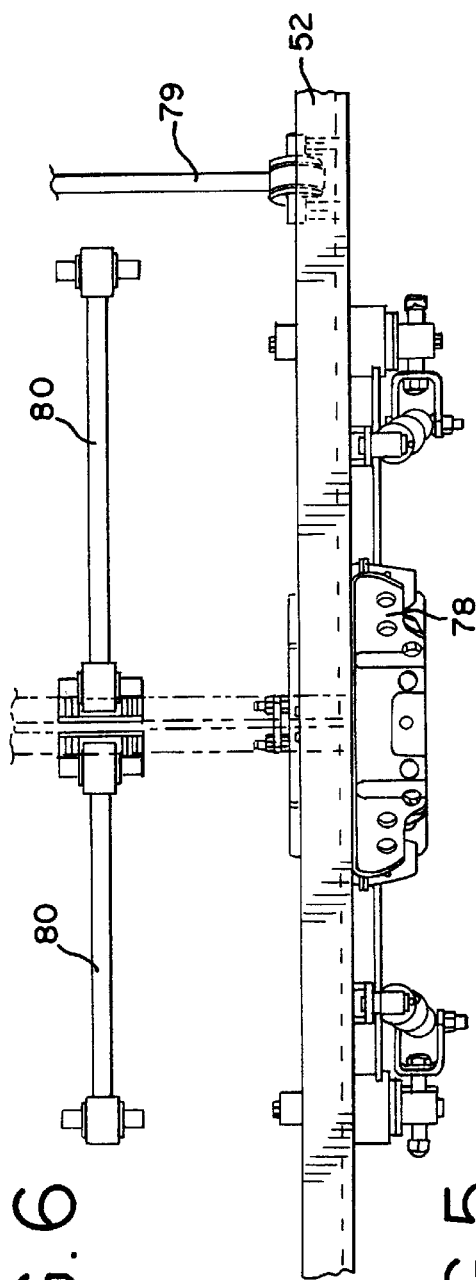
FIG. 6 is a top view of FIG. 3.
Figure 5:
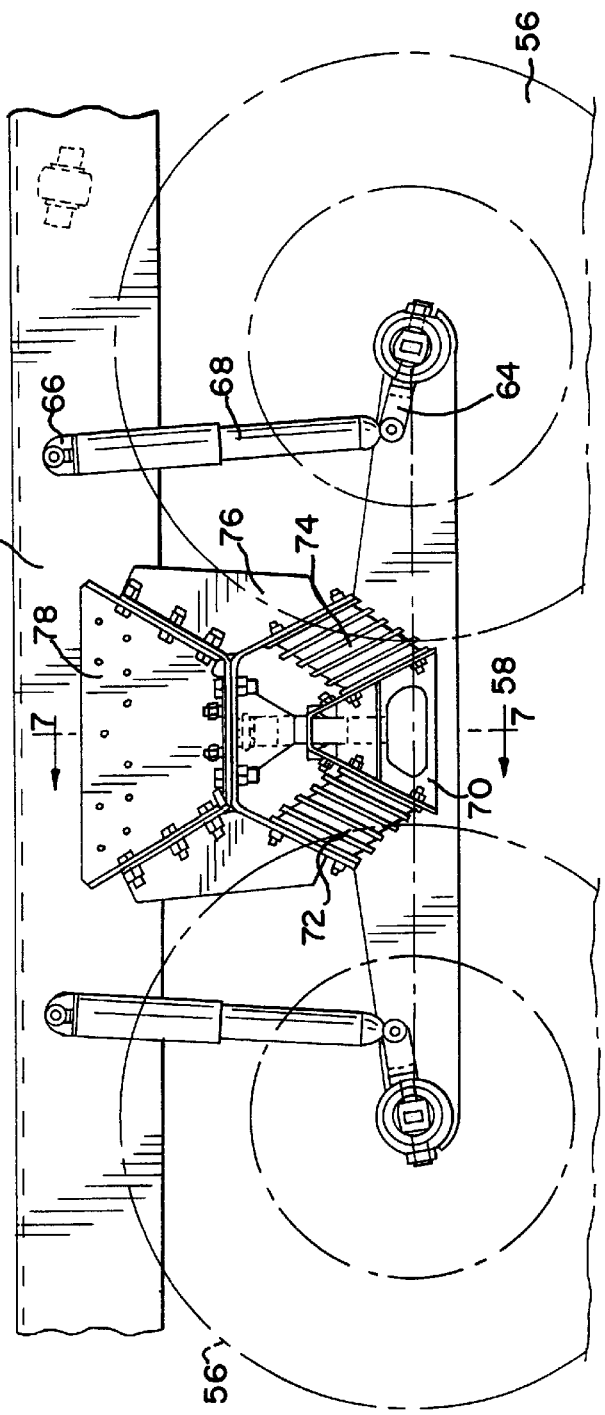
FIG. 5 is a side elevational view of FIG. 3.
Figure 8:
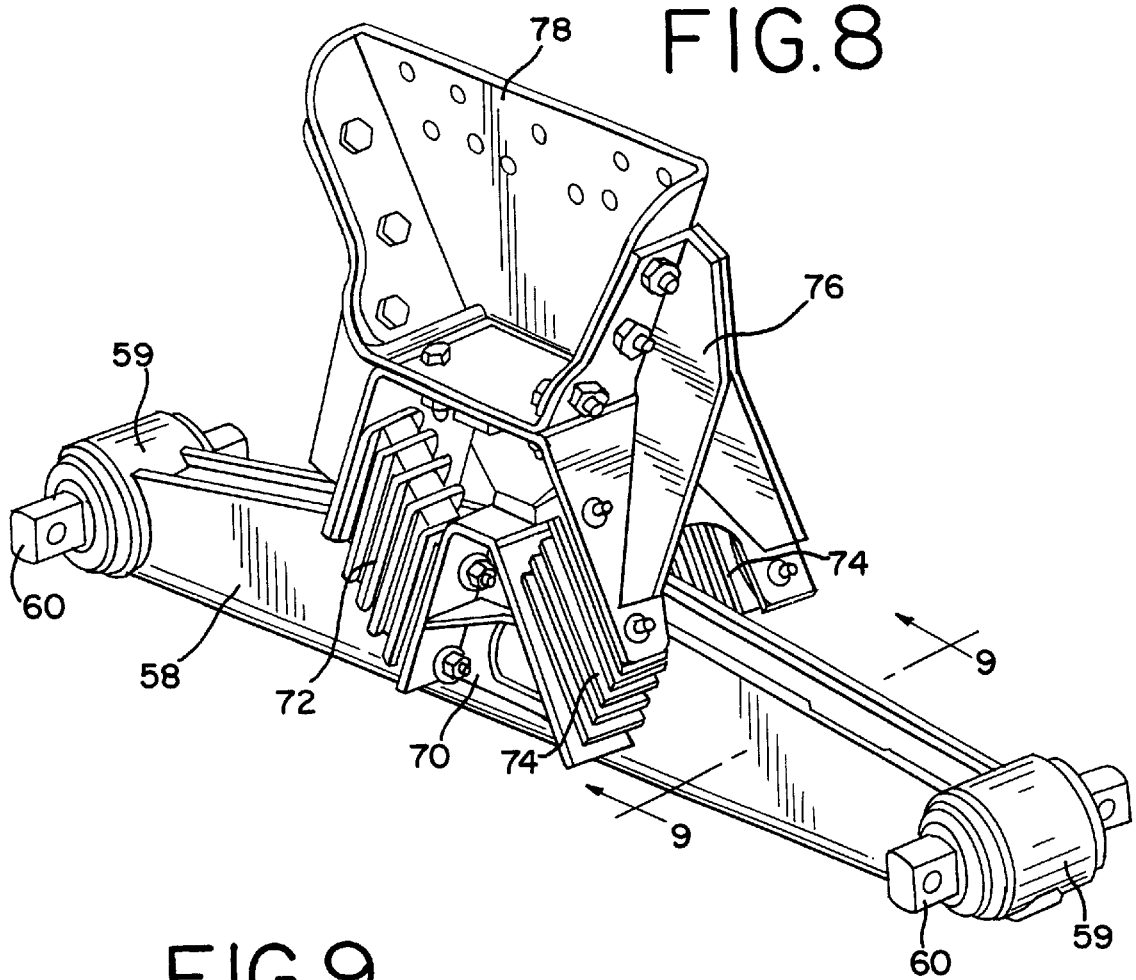
FIG. 8 is a perspective view of certain components of the vehicle suspension illustrated in FIG. 3.

FIGS. 3–8 illustrate a vehicle suspension generally designated 50 designed to support longitudinally extending C-shaped vehicle frame rails 52 above laterally extending vehicle axles 54 of a tandem axle configuration for the vehicle. As will be appreciated by those skilled in the art, components for vehicle suspension 50 are duplicated on each side of the vehicle. It will also be appreciated that vehicle wheels 56, as best shown in FIG. 5, are mounted to the ends of vehicle axles 54 in known manner. Further, it will be appreciated that vehicle frame rails 52 are connected by one or more vehicle frame across members (not shown).

Each side of the tandem axle vehicle suspension 50 includes a longitudinally extending fabricated equalizing beam 58, also known in the art as a walking beam. Each beam 58 includes bushing tubes 59 and bar pin axle connections 60 positioned on opposite ends thereof. Each end of beam 58 is connected to a respective end of the vehicle axles 54 by way of axle connection brackets 62 and associated pins that permit connection with the bar pin axle connections 60.

Lower shock mounting brackets 64 are mounted to the outboard wall of beam 58 at a position adjacent to each axle 54 of the tandem axle and are positioned slightly longitudinally closer to the central portion of beam 58. Associated upper shock mounting brackets 66 are mounted on the outer wall of the C-shaped vehicle frame rail 52. In known manner, shock absorbers 68 are mounted between each associated pair of lower shock mounting brackets 64 and upper shock mounting brackets 66.

As further shown, an A-shaped bracket 70 is mounted to the outboard wall of beam 58, preferably by welding. In similar fashion, another A-shaped bracket is preferably welded to the inboard wall of beam 58. Two longitudinally separated bolster springs 72, 74 are positioned on opposite walls of A-shaped bracket 70. These walls of A-shaped bracket 70 are oriented to provide the proper respective mounting angles for bolster springs 72, 74.

In similar fashion, the A-shaped bracket mounted on the inboard wall of equalizing beam 58 has two longitudinally separated bolster springs 72, 74 mounted to its opposite walls. These walls are also oriented to provide the preferred mounting angle for the bolster springs. As shown, bolster springs 72, 74 are preferably mounted to their respective A-shaped brackets 70 by way of fasteners.

Bolster springs 72, 74 are preferably rubber. As such, they are lighter than steel springs. They also preferably function in shear and compression.

A fabricated saddle 76 is mounted to the opposite ends of each of the bolster springs 72, 74. As illustrated, saddle 76 preferably includes an inverted or U or V-shaped surface that includes two spring bolster mounting surfaces on the legs thereof. Each such leg includes a centrally located cut out portion at each respective end, which is designed to accommodate equalizing beam 58 and permit bolster springs 72 to straddle the beam on opposite sides thereof and further to permit bolster springs 74 to also straddle the beam on opposite sides thereof.

In the preferred embodiment shown and described herein, the bolster spring pairs are positioned about and straddle the beam to permit the uncoupling of the articulation and vertical motions of the suspension from its induced fore/aft motion. In this regard, the bolster springs are positioned coincident with the wind up center of the equalizing beam. In this unique arrangement, no cross tube is required and a conventional sized equalizing beam can be used.

A modular shear/attachment plate 78 is preferably mounted to fabricated saddle 76. In that regard, in the preferred arrangement, the shear/attachment plate 78 is preferably fastened to the base of the inverted U or V-shaped surface of saddle 76. In this preferred arrangement, shear/attachment plate 78 is also preferably mounted to side walls of saddle 76.

Modular shear plate 78 includes a wide bottom wall and tapering side walls that form a mounting surface to saddle 76. Shear plate 78 also includes a spreaded footprint that enables it to be mounted to the vehicle frame rail.

These features increase the structural integrity of shear plate 78. They also make shear plate 78 a stand-alone product that can carry all vertical loads. In other words, shear plate 78 does not require an associated frame cross member.

Shear plate 78 nests within saddle 76 during assembly, as saddle 76 is placed over the bottom and tapered side walls of the plate during such assembly. In the preferred manner, the frame and suspension are inverted during assembly. The geometry of shear plate 78 allows a plurality of such components to be stacked, which facilities shipping and storage thereof.

As will be understood by those skilled in the art, bores or holes can be machined through the mounting surface/footprint area of shear/attachment plate 78, as desired, to permit the plate to adapt to a variety of vehicle frame configurations. As such, use of this unique shear/attachment plate allows for a universal saddle subassembly that can be sized and adapted for all vehicle frame configurations, including all ride heights and frame widths. A single main saddle subassembly can be used for all such configurations. This substantially reduces costs related to manufacture and inventory of vehicle suspensions for tandem axle configurations.

The vehicle suspension also includes laterally extending control rods 79 and longitudinally extending control rods 80. Control rods 79, 80 are mounted in known manner. Control rods 79 provide roll stability. Control rods 80 react and control axle torque.

Figure 9:
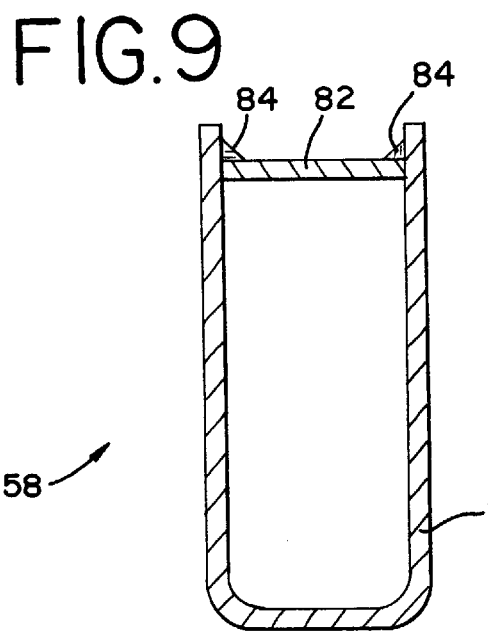
FIG. 9 is a sectional view taken along line 9—9 of FIG. 8.

FIG. 9 illustrates the preferred construction of fabricated equalizing beam 58. Equalizing beam 58 preferably includes a longitudinally extending U-shaped main channel 81 and a corresponding longitudinally extending top wall 82. Equalizing beam 58 is tapered for constant stress. It is formed with a body and top plate and provides improved ground clearance.

As shown, weld lines 84 extend longitudinally to weld main channel 80 and top wall 82 together. As will be appreciated by those skilled in the art, laterally extending weld lines are used to weld top wall 82 to bushing tubes 59 that surround bar pin axle connections 60.

With this arrangement, the weld complexity for equalizing beam 58 is simplified. The resultant weld condition is continuous on the top surface of the beam, eliminating the need for a discontinuous center weld, which is often difficult to produce. This arrangement permits the A-shaped fabricated brackets to be attached to the walls of the main channel on both the inboard and outboard walls thereof, which in turn permits mounting of the split pair bolster spring assembly.

In addition, this positioning of the weld on the top of the beam permits the weld to work in compression rather than in tension, providing greater durability. Further benefits derivable from this arrangement have been described above and others will be appreciated by those skilled in the art.

Figure 10:
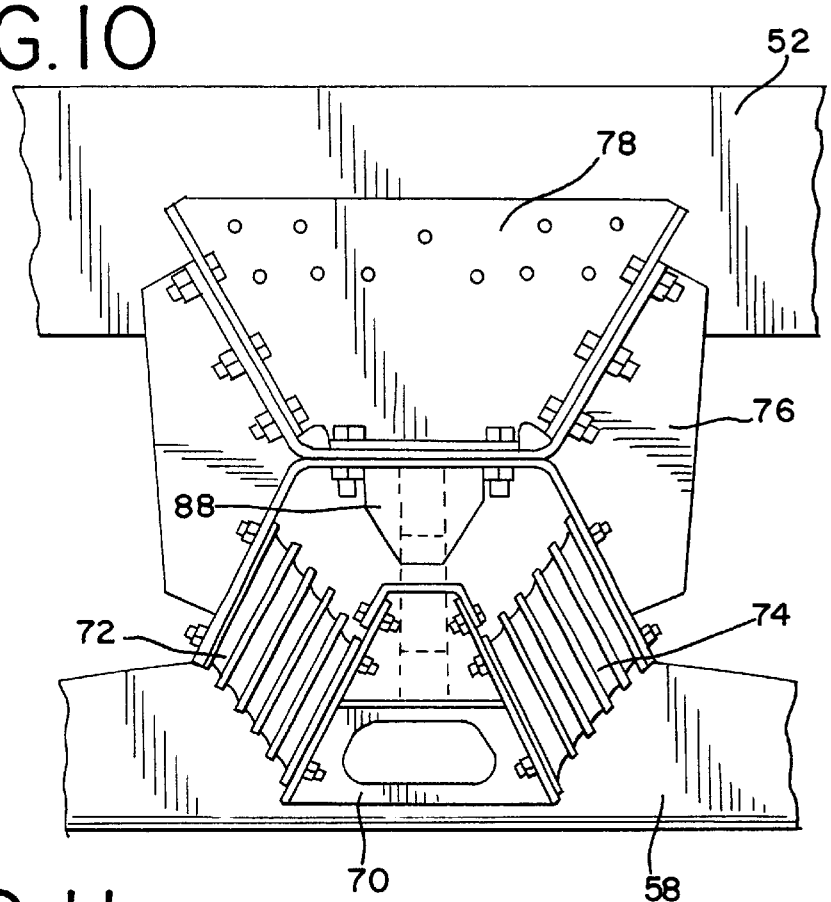
FIG. 10 is a side elevational view of vehicle suspension components shown in a first condition.

FIG. 10 illustrates the vehicle suspension in a first condition, namely in an empty or lightly loaded condition. In this condition, the load is on the bolster springs 72, 74 only. The suspension has a low spring rate and provides relatively comfortable ride conditions.

Figure 11:
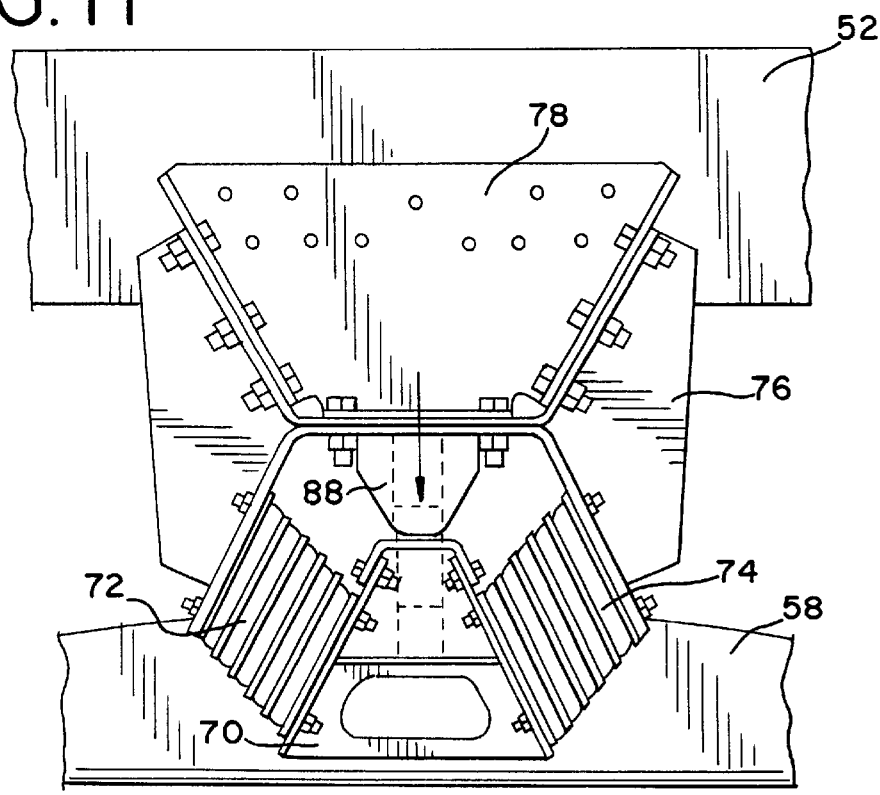
FIG. 11 is a side elevational view of the vehicle suspension components of FIG. 10 shown in a second condition.

FIG. 11 illustrates the vehicle suspension in a second condition, namely in a relatively heavily loaded condition.

In this condition, an auxiliary spring 88 engages the top surface of A-shaped bracket 70 to share the load. This provides a higher spring rate and increased stability, which are desired in this condition. It provides these desired effects without significantly affecting ride comfort.

While this invention has been described with reference to certain illustrative aspects, it will be understood that the description shall not be construed in a limiting sense. Rather, various changes and modifications can be made to the illustrative embodiment without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

What is claimed is:

1. A vehicle suspension for connecting a vehicle frame rail to a first vehicle axle and for connecting the vehicle frame rail to a second vehicle axle, comprising:

an equalizing beam having a first end connected to said first vehicle axle and a second end connected to said second vehicle axle;

a bolster spring assembly connected to said equalizing beam;

a saddle connected to said bolster spring assembly; and a shear plate connected to said saddle and to the vehicle frame rail having a first saddle mounting wall, a second saddle mounting wall and a third saddle mounting wall, said second saddle mounting wall extending from said first saddle mounting wall at a second saddle mounting wall first end and continuously tapering outwardly with respect to said first saddle mounting wall to a second saddle mounting wall second end, said third saddle mounting wall extending from said first saddle mounting wall at a third saddle mounting wall first end and continuously tapering outwardly with respect to said first saddle mounting wall to a third saddle mounting wall second end, such that said second saddle mounting wall first end and said third saddle mounting wall first end are closer to each other than said second saddle mounting wall second end and said third saddle mounting wall second end.

2. The vehicle suspension defined by claim 1 wherein said vehicle suspension connects a longitudinally extending vehicle frame rail to a first laterally extending vehicle axle and further connects said longitudinally extending vehicle frame rail to a second laterally extending vehicle axle separated longitudinally from and extending generally parallel to said first laterally extending vehicle axle.

3. The vehicle suspension defined by claim 1 further comprising a first shock absorber having a first end mounted adjacent to the first end of said equalizing beam and a second end mounted to the vehicle frame rail, and a second shock absorber having a first end mounted adjacent to the second end of said equalizing beam and a second end mounted to the vehicle frame rail.

4. The vehicle suspension defined by claim 1 wherein said equalizing beam comprises a fabricated equalizing beam.

5. The vehicle suspension defined by claim 1 wherein said equalizing beam extends longitudinally between said first vehicle axle and said second vehicle axle, and includes a longitudinally extending U-shaped main channel and a longitudinally extending top wall welded to said main channel.

6. The vehicle suspension defined by claim 1 further comprising a first A-shaped bracket mounted to said equalizing beam on an inboard wall thereof and a second A-shaped bracket mounted to said equalizing beam on an outboard wall thereof, and wherein said bolster spring assembly is mounted to said first and second A-shaped brackets.

7. The vehicle suspension defined by claim 1 wherein said bolster spring assembly includes a first bolster spring positioned outboard said equalizing beam, a second bolster spring positioned outboard said equalizing beam and closer to the first end of said equalizing beam than said first bolster spring, a third bolster spring positioned inboard said equalizing beam, and a fourth bolster spring positioned inboard said equalizing beam and closer to the first end of said equalizing beam than said third bolster spring.

8. The vehicle suspension defined by claim 7 wherein said first and third bolster springs straddle said equalizing beam, and wherein said second and fourth bolster springs straddle said equalizing beam.

9. The vehicle suspension defined by claim 8 wherein said equalizing beam has a wind up center, and wherein said first, second, third and fourth bolster springs are positioned coincident with said wind up center of the equalizing beam.

10. The vehicle suspension defined by claim 7 wherein said first, second, third and fourth bolster springs are rubber.

11. The vehicle suspension defined by claim 1 wherein said saddle comprises a fabricated saddle.

12. The vehicle suspension defined by claim 1 wherein said saddle includes an inverted U- or V-shaped surface to connect said saddle and said bolster spring assembly.

13. The vehicle suspension defined by claim 12 wherein said inverted U- or V-shaped surface includes a first leg having first and second bolster spring mounting surfaces separated by a centrally positioned cut out portion to accommodate the equalizing beam, and wherein said inverted U- or V-shaped surface further includes a second leg having first and second bolster spring mounting surfaces separated by a centrally positioned cut out portion to accommodate the equalizing beam, and said inverted U- or V-shaped surface further includes a base separating said first leg from said second leg.

14. The vehicle suspension defined by claim 13 wherein said first leg of said inverted U- or V-shaped surface extends from said base at a first leg first end and continuously tapers outwardly with respect to said base to a first leg second end, and wherein said second leg of said inverted U- or V-shaped surface extends from said base at a second leg first end and continuously tapers outwardly with respect to said base to a second leg second end, such that said first leg first end and said second leg first end are closer to each other than said first leg second end and said second leg second end.

15. The vehicle suspension defined by claim 12 wherein said saddle further includes a U- or V-shaped surface to connect said saddle and said shear plate.

16. The vehicle suspension defined by claim 15 wherein said U- or V-shaped surface includes a base, a first leg, and a second leg, and wherein said first leg of said U- or V-shaped surface extends from said base at a first leg first end and continuously tapers outwardly with respect to said base to a first leg second end, and wherein said second leg of said U- or V-shaped surface extends from said base at a second leg first end and continuously tapers outwardly with respect to said base to a second leg second end, such that said first leg first end and said second leg first end are closer to each other than said first leg second end and said second leg second end.

17. The vehicle suspension defined by claim 1 wherein said shear plate includes a footprint area positioned generally between said first and second saddle mounting walls and wherein said footprint area includes bores extending through it to facilitate connection to the vehicle frame rail.

* * * * *